(12) United States Patent  (10) Patent No.: US 7,413,244 B2
Tanaka et al.  (45) Date of Patent: Aug. 19, 2008

(54) CONTAINER HOLDER

(75) Inventors: Shunji Tanaka, Kobe (JP); Seiichi Ino, Kakogawa (JP); Naoki Hashimoto, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 101 days.

(21) Appl. No.: 11/117,055

(22) Filed: Apr. 27, 2005

(65) Prior Publication Data

US 2005/0242605 A1 Nov. 3, 2005

(30) Foreign Application Priority Data

Apr. 28, 2004 (JP) ............................. 2004-133287

(51) Int. Cl.
*B60N 3/10* (2006.01)
(52) U.S. Cl. .................. 296/198; 296/37.8; 224/274; 224/414; 224/544; 224/926
(58) Field of Classification Search ............... 296/198, 296/37.1, 37.8, 37.13; 224/274, 408, 410, 224/414, 483, 488, 544, 535, 541, 540, 926; 280/DIG. 5
See application file for complete search history.

(56) References Cited

U.S. PATENT DOCUMENTS 4,163,374 A * 8/1979 Moore et al. ............... 62/457.4
5,720,516 A * 2/1998 Young .................... 297/188.18
6,170,787 B1 * 1/2001 Morgan .................... 248/311.2
6,582,002 B2 6/2003 Hogan et al.
6,851,736 B1 * 2/2005 Klopp et al. ................ 296/37.8
6,869,120 B2 * 3/2005 Johnson et al. ........... 296/37.12
7,044,527 B2 * 5/2006 Maeda et al. ............... 296/37.1
7,066,363 B2 * 6/2006 Lecoq ......................... 224/276
2003/0000983 A1 * 1/2003 Tyrer ........................... 224/572
2004/0025530 A1 * 2/2004 Perrins ....................... 62/457.5
2004/0195855 A1 * 10/2004 Takeshima .................. 296/37.1

FOREIGN PATENT DOCUMENTS

JP 2003-276494 9/2003
JP 2005067498 A * 3/2005

* cited by examiner

*Primary Examiner*—Jason S Morrow
(74) *Attorney, Agent, or Firm*—Alleman Hall McCoy Russell & Tuttle LLP

(57) ABSTRACT

A container holder typically including a concave portion which is formed on an outside of a utility vehicle and which is configured to be positioned forward of a driver's seat. A container may be put into or taken out of the container holder. The container holder has a pad configured to inhibit a container accommodated therein from disengaging from the container holder. When a small item is accommodated in the container holder, the pad serves as a lid.

2 Claims, 6 Drawing Sheets

FRICTION FORCE A

CONTAINER HOLDER

BACKGROUND OF THE INVENTION

1. Field of the Invention

The present invention relates to a container holder for use with utility vehicles configured to transport or transfer materials indoors or outdoors.

2. Description of the Related Art

A utility vehicle typically comprises a drive means such as an engine, riders' seats, a metal cabin frame, wheels, etc. To enable a rider to easily carry out various tasks utility vehicles are generally not equipped with a car body portion and car body components such as front and side windows in an area forward of and lateral of a driver's seat,. As in a typical automobile, the utility vehicle is desirably equipped with a container holder in which a water container, a water bottle, etc., is placed to enable a rider or a passenger to drink water or something freely.

The general automobile is equipped with a container holder mounted as a part of in-vehicle components to, for example, an instrument panel section, a center console section, or a door panel section.

In recent years, in order to reduce a turning radius, utility vehicles of smaller sizes have been manufactured, and their wheelbase, i.e., distance between front wheels and rear wheels, tends to be reduced. For this reason, utility vehicles have a limited inner space in a driver's seat section. As shown in FIG. 1B, a shift lever 21, a drive system shift lever 22, a differential gear unit locking/unlocking lever 23, a speedometer 24, etc., are mounted to an instrument panel section 25. If a container holder is mounted to the limited inner space of the driver's seat section, for example, a lower portion of a center portion of the instrument panel section 25, the rider or the passenger may be forced to change a posture or a view point by stretching an arm to reach a container in the container holder or otherwise by looking downward at the container holder. Japanese Laid-Open Patent Application Publication No. 2003-276494 and U.S. Patent Application Publication No. 6582002 disclose an operating machine vehicle and a golf cart which do not have an upper body (roof portion) and which are provided with a container holder.

However, there has not yet been disclosed a vehicle optimized for efficient use of a limited space of a driver's seat, which enables a rider to put a container into a container holder or take it out of the container holder without substantially changing driving posture and view point.

SUMMARY OF THE INVENTION

The present invention addresses the above described condition, and an object of the present invention is to provide a container holder which is efficiently mounted in a space in the vicinity of a driver's seat in a utility vehicle such that a rider or a passenger can easily put a container into the container holder and easily take it out of the container holder.

According to the present invention, there is provided a container holder comprising a concave portion which is formed on an outside of a utility vehicle and which is configured to be positioned forward of a driver's seat.

The concave portion may be formed in an upper surface of a front fender of the vehicle and configured to extend substantially vertically to form a tubular shape such that the concave portion opens upward and has a bottom portion.

In the above constructed container holder, a rider can put a container into the container holder and take it out of the container holder without substantially changing driving posture or view point.

A water drain hole may be formed in the bottom portion of the concave portion.

In this structure, rain water or muddy water entering the container holder is discharged through the water drain hole. So, the container or the like is inhibited from being contaminated. The rider can comfortably hold the container or the like, which is kept clean.

The above constructed container holder may be configured to have a depth smaller than a height of a container to be accommodated therein. The container holder may further comprise a pad provided in the vicinity of an opening of the container holder and configured to inhibit the container accommodated in the container holder from disengaging from container holder. The pad may have slits configured to extend radially outward from a substantially center portion thereof.

The above constructed container holder can inhibit the container from disengaging from the container holder. In addition, the container or the like is easily put into and taken out of the container holder.

The pad may be provided with a plurality of protrusions formed on an upper surface of the pad and configured to be arranged concentrically around the substantially center portion. The protrusions may be configured to be inclined inward toward the substantially center portion.

The above structured pad can inhibit the container from disengaging from the container holder.

The above and further objects and features of the invention will more fully be apparent from the following detailed description with accompanying drawings.

DETAILED DESCRIPTION OF THE PREFERRED EMBODIMENTS

Hereinafter, an embodiment of a utility vehicle will be described with reference to the drawings.

Figure 1A:
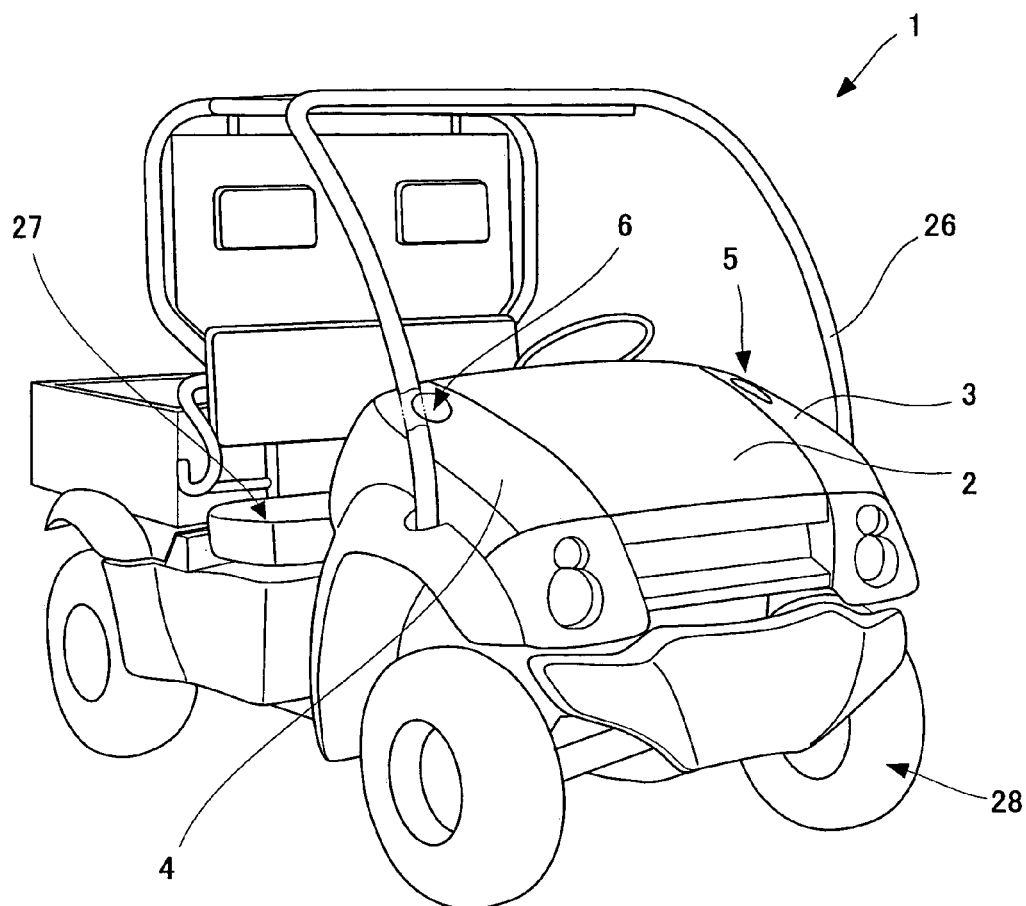
FIG. 1A is a view showing a construction of a utility vehicle according to an embodiment of the present invention.
Figure 1B:
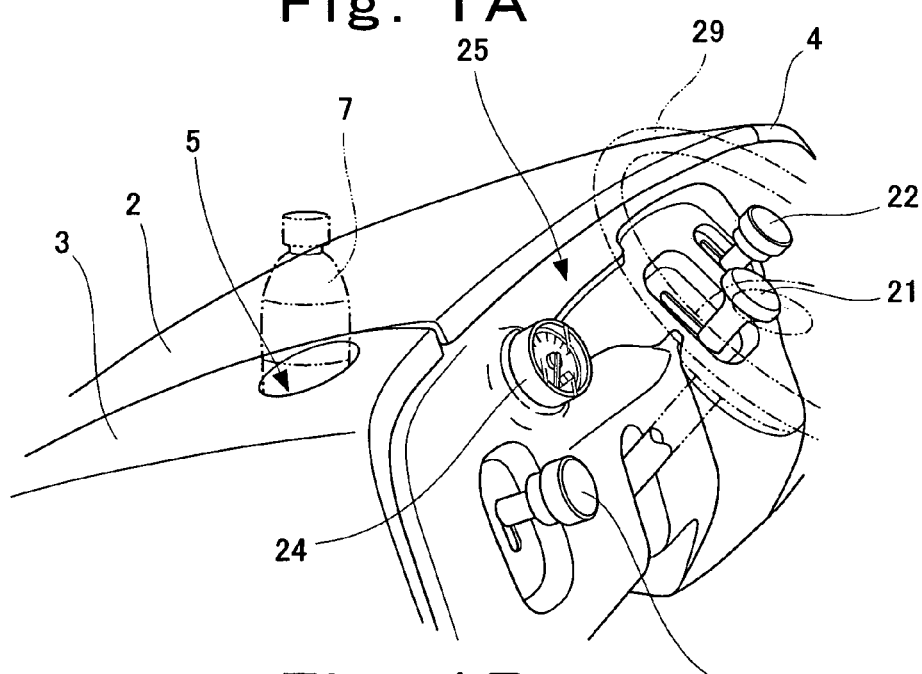
FIG. 1B is a partial perspective view showing a structure surrounding a front panel as viewed from the left and rear side of a front fender of FIG. 1A.

FIG. 1A is a view showing a construction of a utility vehicle according to the embodiment of the present invention, and FIG. 1B is a partial perspective view showing a structure surrounding a front panel as viewed from the left and rear side of a front fender of FIG. 1A. Turning now to FIGS. 1A and 1B, a utility vehicle 1 comprises a drive means such as an engine (not shown), a rider's seat, a metal cabin frame 26, wheels 28, etc. A steering handle 29 (indicated by two-dotted line), an instrument panel section 25, etc., are positioned forward of the rider's seat 27. A shift lever 21 and a drive system shift lever 22 are attached to a region of a center portion of the instrument panel section 25. A differential gear unit locking/unlocking lever 23 is attached to a vicinity of a left side portion of the instrument panel section 25. The steering handle 28, the shift lever 21, the drive system shift lever 22, and the differential gear unit locking/unlocking lever 23, which function as main operation devices, are positioned to enable the rider to easily operate them during travel of the utility vehicle 1. The other components are mounted at other locations.

A utility vehicle is typically used for professional purposes, such as farming, ranching, and hunting. In these cases, the rider frequently gets in and out of the vehicle, and therefore, the vehicle is not equipped with an upper body (roof section) which defines an inside and an outside of a general automobile. Because of the absence of the upper body, the utility vehicle is not equipped with a windshield (front glass forward of the driver's seat) mounted to the automobile for ensuring the rider's view and protecting the rider from wind and rain.

In this construction, the rider or a passenger can reach, by stretching an arm, a hood 2 removably mounted over a front portion of the vehicle and positioned forward of the driver's seat, a left front fender 3 and a right front fender 4 which are mounted adjacent right and left sides of the hood 2 in a width direction of the vehicle 1.

Accordingly, a left container holder 5 and a right container holder 6 are respectively provided in a region of the left front fender 3 and the right front fender 4 so that the rider or the passenger may reach these holders 5 and 6. The left container holder 5 and the right container holder 6 are respectively formed by concave portions provided in the left front fender 3 and the right front fender 4. The rider or the passenger can reach a container 7, for example, a water bottle, placed in the left container holder 5 or the right container holder 6 without being forced to substantially change posture or view point.

As shown in FIG. 1B, the concave portion forming the left container holder 5 is cylindrical and configured to extend substantially vertically to enable the container 7 to be placed therein. The left container holder 5 is configured to be recessed to have a depth so that an upper portion of the container 7 placed therein protrudes from the left front fender 3. That is, the depth of the left container holder 5 is smaller than a height of the container 7 accommodated therein. As in the left container holder 4, the concave portion forming the right container holder 6 is cylindrical and configured to extend substantially vertically to enable the container 7 to be placed therein, and to be recessed to have a depth so that an upper portion of the container 7 placed therein protrudes from the right front fender 3. That is, the depth of the right container holder 6 is smaller than the height of the container 7 accommodated therein.

Figure 2:
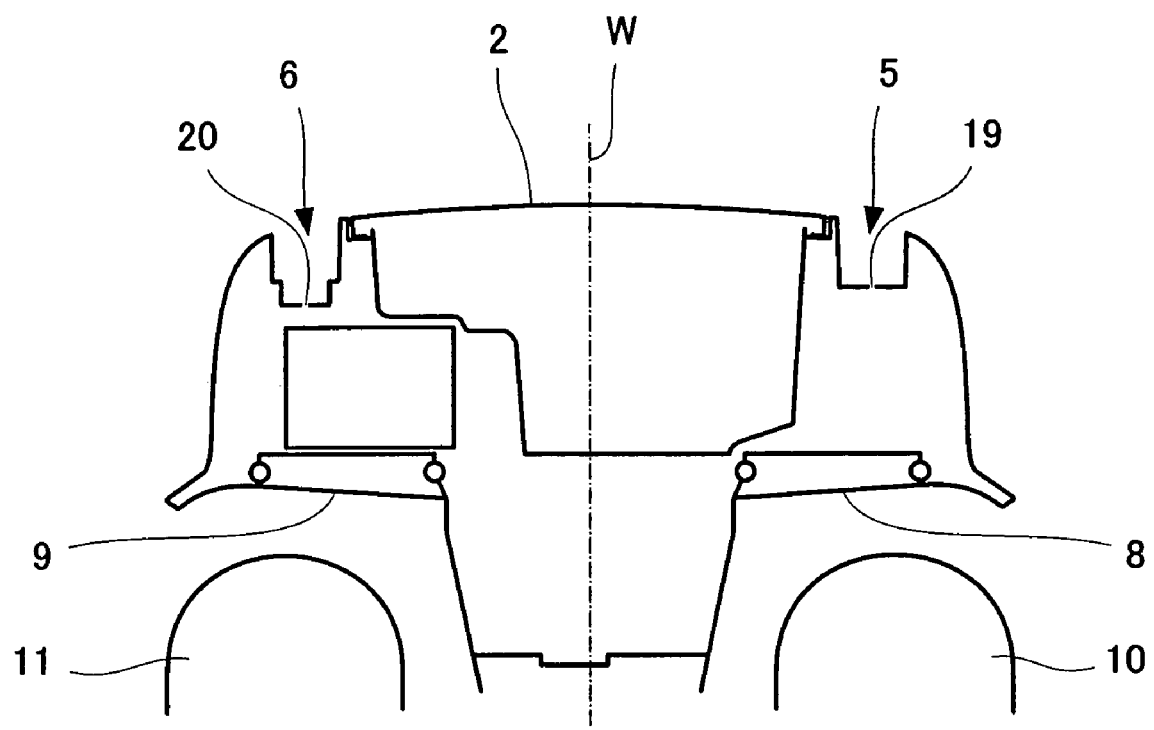
FIG. 2 is a cross-sectional view schematically showing a construction of the utility vehicle according to the embodiment as viewed from the front, which is sectioned along a plane including a center of the container holder.

FIG. 2 is a cross-sectional view schematically showing a construction of the utility vehicle according to the embodiment as viewed from the front, which is sectioned along a plane including a center of the container holder.

As shown in FIG. 2, the left container holder 5 and the right container holder 6 are positioned to be substantially symmetric with respect to a center W in a width direction of the vehicle 6. The right container holder 6 includes a concave portion 20 at a bottom portion thereof, which has a diameter smaller than that of its upper portion to enable a small-sized container 7 to be stably accommodated therein. A water drain hole 19 and a water drain hole 20 are formed in the left container holder 5 and the right container holder 6, respectively, which are positioned on a front side of the vehicle 1. A left tire housing 8 is provided below the left container holder 5 to cover a left tire 10 from above. In addition, a right tire housing 9 is provided on the right side of the vehicle 1 similar to the left tire housing 8. The left tire housing 8 and the right tire housing 9 serve to inhibit damage to the vehicle, which may be caused by splashes of mud, dirt, or stones, and further serve to inhibit entry of muddy water or the like into the left container holder 5 and the right container holder 6 through the water drain holes 19 and 20. Since the container holders 5 and 6 and the tire housings 8 and 9 are thus positioned, it is possible to inhibit the container 7 from being contaminated by the muddy water or the like. As a result, the rider and the passenger can comfortably hold the container 7 free from muddy water or the like.

Figure 3A:
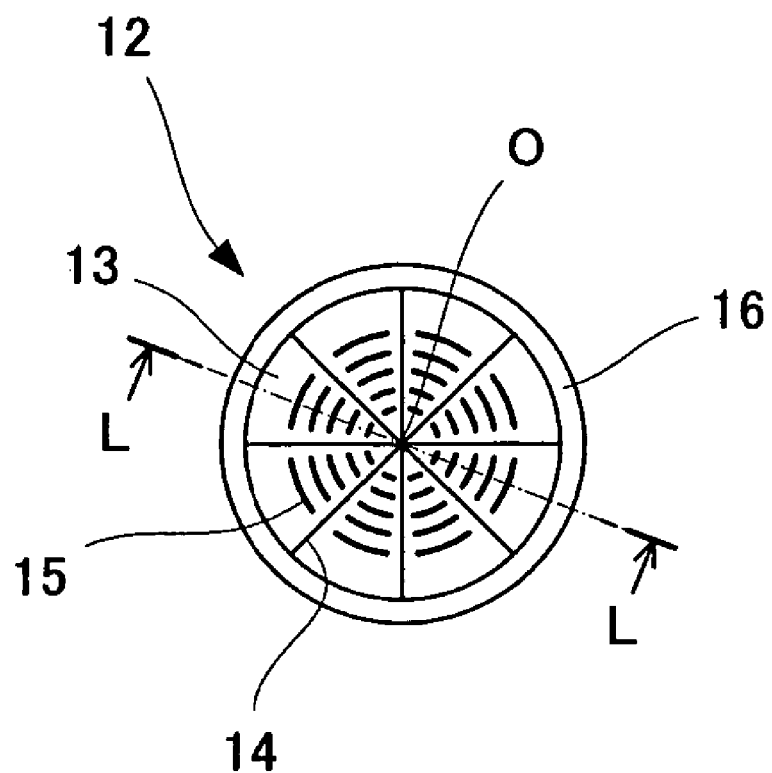
FIG. 3A is a plan view of a pad configured to inhibit a container from disengaging from the container holder, according to the embodiment.
Figure 3B:
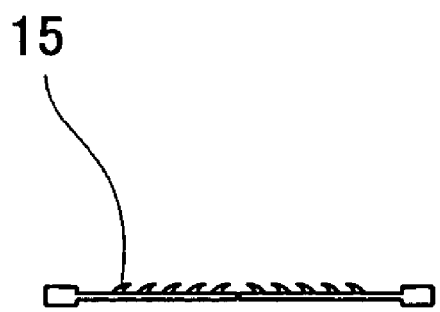
FIG. 3B is a view taken in the direction of arrows substantially along line L-L of FIG. 3A.

FIG. 3A is a view of a pad according to the embodiment of the present invention. FIG. 3B is a view taken in the direction of arrows substantially along line L-L of FIG. 3A. A pad 12 of FIG. 3A is mounted to a groove 18 (see FIG. 4) in the vicinity of an opening of the left container holder 5 or the right container holder 6 (see FIG. 2) to inhibit the container 7 from disengaging therefrom, for example, being ejected therefrom, while the utility vehicle 1 is traveling in rough terrain. As shown in FIGS. 3A and 3B, the pad 12 is circular and has elastic portions 13 in a region on a center side except for an outer peripheral portion 16 and its vicinity. In addition, the pad 12 has slits 14 extending radially outward from a center "O" (a substantially center portion) to define the elastic portions 13. The elastic portions 13 defined by the slits 14 are vertically deformable. As shown in FIGS. 3A and 3B, a plurality of protrusions 15 are formed on an upper surface of the elastic portions 13 and configured to be arranged in a concentric configuration around the center "O." As shown in FIG. 3B, the protrusions 15 extend such that their upper ends are inclined inward toward the center "O" by an angle of about 0 to 45 degrees with respect to a vertical direction. When the container 7 is brought into contact with the protrusions 15, the resulting friction force inhibits the container 7 from disengaging, for example, being ejected, from the elastic portions 13, and hence from the left container holder 5. In addition, the outer peripheral portion 16 of the pad 12 has a thickness larger than that of the elastic portions 13 to enable the pad 12 to stably hold the container 7. Thus structured, the container 7 is inhibited from disengaging from the left container holder 5, and is held more stably and retained securely by the elastic deformation of the elastic portions 13, while the vehicle is traveling in rough terrain.

Figure 4A:
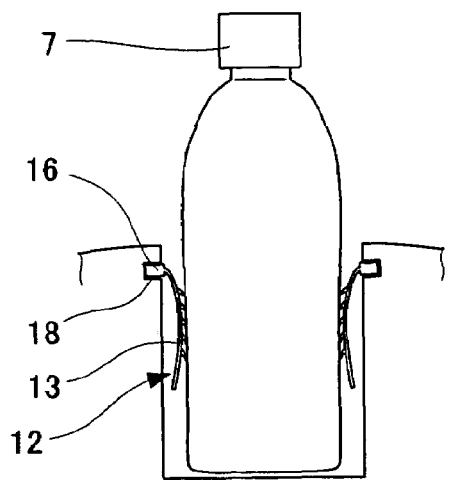
FIG. 4A is a view schematically showing a construction in which the pad is mounted to the container holder, and a state in which the pad is pushed downward by the container.
Figure 4B:
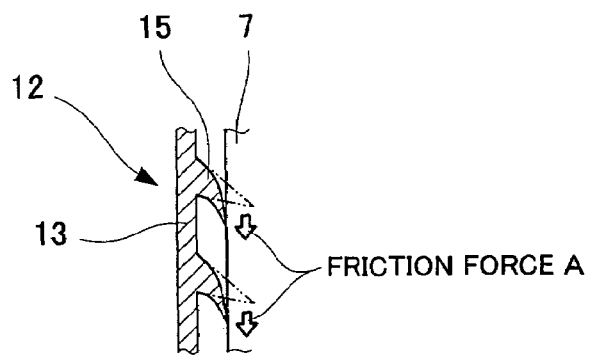
FIG. 4B is a partially enlarged view of a contact portion between the container and the pad of FIG. 4A.
Figure 4C:
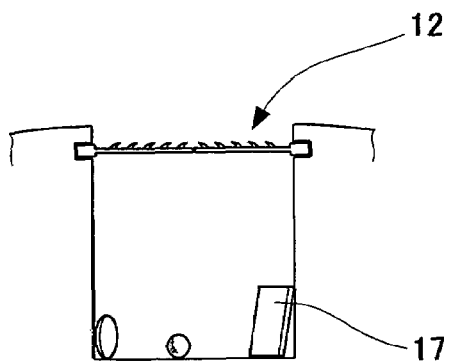
FIG. 4C is a view showing a state in which small items are accommodated in the container holder.

FIG. 4A is a view schematically showing a construction in which the pad is mounted to the container holder, and a state in which the pad is pushed downward by the container. FIG. 4B is a partially enlarged view of a contact portion between the container and the pad of FIG. 4A. FIG. 4C is a view showing a state in which items are accommodated in the container holder.

As shown in FIG. 4A, the pad 12 engages with the groove 18 formed on an inner peripheral face of the container holder 5. The groove 18 extends horizontally over an entire circumference of the container holder 5. A width of the groove 18 is configured to be smaller than a width of the outer peripheral portion 16 to inhibit the pad 12 from disengaging from the groove 18. In order to enable the pad 12 to be firmly secured to the groove 18, the pad 12 may be mounted to the container holder by a mounting member such as a screw.

When the container 7 is put into the left container holder 5 or the right container holder 6, the elastic portions 13 of the pad 12 are pushed downward by the container 7 within the left container holder 5 or the right container holder 6. In addition, as shown in FIG. 4B, when the container 7 makes contact with the protrusions 15 of the elastic portions 13, the protrusions 15 are elastically deformed and bent downward, thereby generating a friction force A (see an arrow in FIG. 4B) between the container 7 and the pad 12 which is applied to inhibit the container 7 from disengaging from the left container holder 5 or the right container holder 6. In FIG. 4B, a two-dotted line indicates the protrusions 15 before being elastically deformed. As shown in FIG. 4C, when small items 17 which do not elastically deform the elastic portions 13 are placed into the left container holder 5 or the right container holder 6, the elastic portions 13 serve as a lid to inhibit the items 17 from being ejected from the left container holder 5 or the right container holder 6.

Figure 5A:
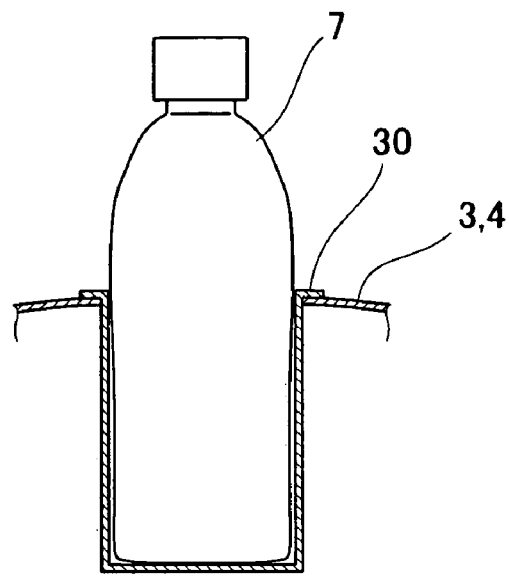
FIG. 5A is a cross-sectional view showing another construction of the container holder which is configured to be separable from a right front fender or a left front fender.
Figure 5B:
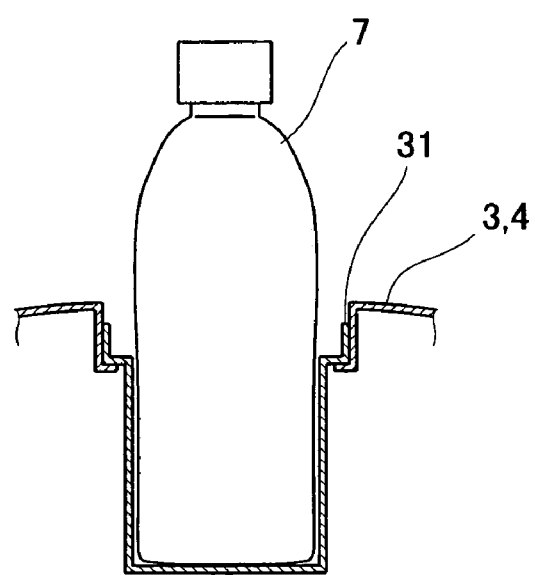
FIG. 5B is a cross-sectional view showing another construction of the container holder of FIG. 5A, which is provided with a step portion.

FIG. 5A is a cross-sectional view showing another structure of the container holder which is configured to be separable from the right front fender or the right front fender. FIG. 5B is a cross-sectional view showing another structure of the container holder of FIG. 5A, which is provided with a step portion.

As shown in FIG. 5A, a container holder 30 is configured to be fitted into an opening of the front fender 3 or 4 and to be easily changed. Therefore, by changing the container holder 30, containers 7 of various shapes can be accommodated therein. As shown in FIG. 3B, a container holder 31 is provided with a step portion in the vicinity of a center portion thereof to allow containers of different diameters to be accommodated therein. Alternatively, the container holder 31 may be provided with plural step portions. In addition to the containers, various items, for example, a markers or spray paint, may be accommodated in the container holder 31. In this case, the pad 12 provided on the container holder 31 can inhibit these items from disengaging from the container holder 31 during travel of the vehicle 1, as in the container holder in FIG. 4C.

Figure 6A:
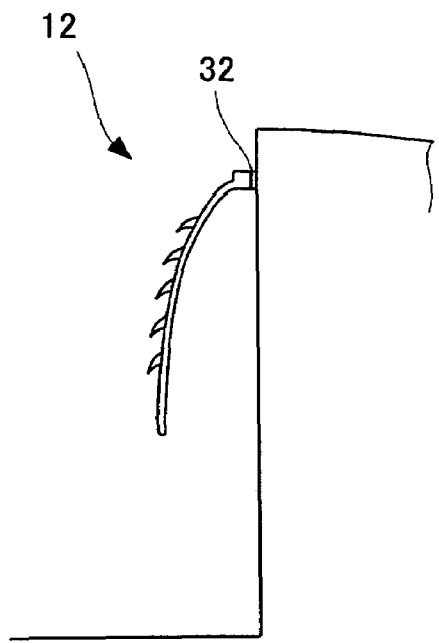
FIG. 6A is a view showing another construction in which the pad is mounted to the container holder.
Figure 6B:
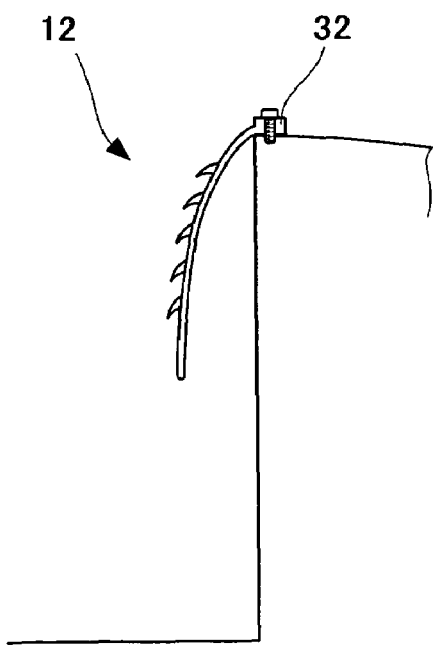
FIG. 6B is a view showing another construction in which the pad is mounted to the container holder.

FIG. 6A is a view showing another construction in which the pad is mounted to the container holder which is not provided with a groove. FIG. 6B is a view showing another construction in which the pad is mounted to the container holder.

As shown in FIG. 6A, when a container holder 32 is not provided with a groove in the vicinity of a mounting portion of the pad 12, the pad 12 is mounted to the mounting portion by, for example, adhesive, or otherwise by a friction force between the pad 12 and the container holder 32. As shown in FIG. 6B the outer peripheral portion 16 of the pad 12 may be mounted to an upper surface of the hood or the fender by a mounting member such as a screw, a bolt, or a clip to allow the pad 12 to be reliably mounted thereto.

Alternatively, the container holders on the right and left sides may be formed by concave portions of different geometric shapes. In further alternative, the pads on the right and left sides may be configured to have different geometric shapes.

The above mentioned container holder with pad may be suitably mounted to the outside of a vehicle configured for traveling in rough terrain.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A container holder comprising:
   a concave portion which is formed on an outside of a utility vehicle and which is configured to be positioned forward of a driver's seat,
      wherein the concave portion is formed in an upper surface of a front fender of the vehicle and configured to extend substantially vertically to form a tubular shape such that the concave portion opens upward and has a bottom portion,
      wherein the container holder is configured to have a depth smaller than a height of a container to be accommodated therein, and
   a pad provided in the vicinity of an opening of the container holder and configured to inhibit an item accommodated in the container holder from disengaging from the container holder,
      wherein the pad has slits configured to extend radially outward from a substantially center portion thereof, and
      wherein the pad is provided with a plurality of protrusions formed on an upper surface of the pad and configured to be arranged concentrically around the substantially center portion, the protrusions being configured to be inclined inward toward the substantially center portion.

2. A container holder comprising:
   a concave portion which is formed on an outside of a utility vehicle and which is configured to be positioned forward of a driver's seat,
      wherein the concave portion is formed in an upper surface of a front fender of the vehicle and configured to extend substantially vertically to form a tubular shape such that the concave portion opens upward and has a bottom portion; and
   a pad for holding a container, wherein the pad is provided in the vicinity of an upper opening of the concave portion and extending horizontally from a periphery of the opening to a substantial center portion of the opening,
      wherein the pad is bendable from a horizontal direction to a vertical direction by a force exerted from above and can be returned back to the horizontal direction when the force is removed therefrom,
      wherein the pad is integrally attached to the concave portion, the pad covers the upper opening of the concave portion from above, and the pad comprises slits configured to extend radially outward from a substantially center portion of the opening, and the pad further comprises elastic portions formed of an elastic material,
      wherein the pad is provided with a plurality of protrusions formed on an upper surface of the pad and configured to be arranged concentrically around the substantially center portion, the protrusions being configured to be inclined inward toward the substantially center portion.

* * * * *